United States Patent Office
3,752,803
Patented Aug. 14, 1973

3,752,803
DERIVATIVES OF 3-(3'β-TRIDIGITOXOSYL-14'β-HYDROXY-5'β-ANDROSTAN - 17'β-YL)-ACRYLIC ACID
Wolfgang Eberlein, Biberach, Riss, and Joachim Heider, Warthausen-Oberhofen, Germany, Walter Kobinger, Vienna, Austria, and Willi Diederen, Biberach, Riss, Germany, assignors to Boehringer Ingelheim G.m.b.H., Ingelheim am Rhein, Germany
No Drawing. Filed Oct. 18, 1971, Ser. No. 190,279
Claims priority, application Germany, Oct. 27, 1970, P 20 52 634.5
Int. Cl. C07c 173/00
U.S. Cl. 260—210.5       6 Claims ABSTRACT OF THE DISCLOSURE
Compounds of the formula

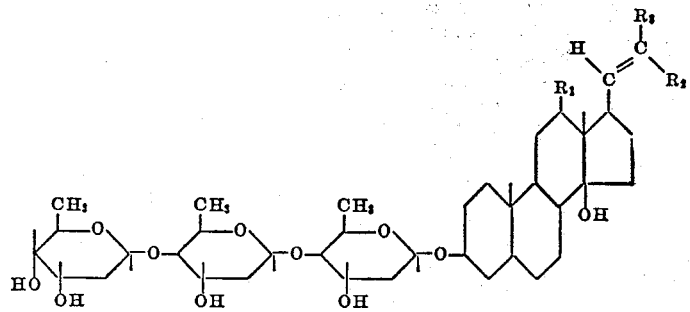

wherein
R₁ is hydrogen or hydroxyl,
R₂ is hydrogen, chlorine, fluorine, alkyl of 1 to 4 carbon atoms, alkoxy of 1 to 4 carbon atoms or cyano, and
R₃ is cyano, carboxyl, carbalkoxy, carbaryloxy or carbaralkoxy.

the compounds are useful as cardiotonics with positive inotropic action.

This invention relates to novel derivatives of 3-(3'β-tridigitoxosyl-14'β-hydroxy-5'β-androstan-17'β-yl) - acrylic acid, as well as to a method of preparing these compounds.

More particularly, the present invention relates to a novel class of tridigitoxosyl-androstane derivatives represented by the formula

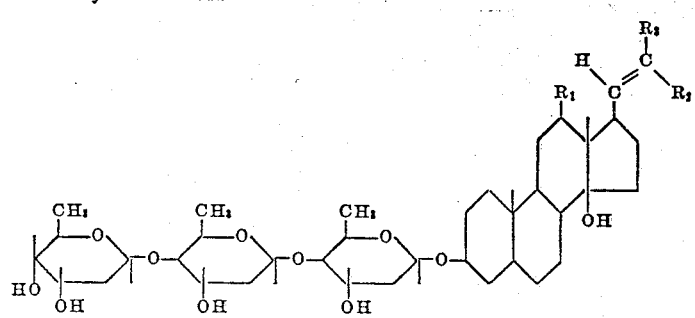

wherein
R₁ is hydrogen or hydroxyl,
R₂ is hydrogen, chlorine, fluorine, alkyl of 1 to 4 carbon atoms, alkoxy of 1 to 4 carbon atoms or cyano, and
R₃ is cyano, carboxyl, carbalkoxy, carbaryloxy or carbaralkoxy.

The compounds embraced by Formula I above may be prepared by PO-activated olefination of the 17β-formyl group of a 3β-tridigitoxosyl-17β-formyl-androstane of the formula

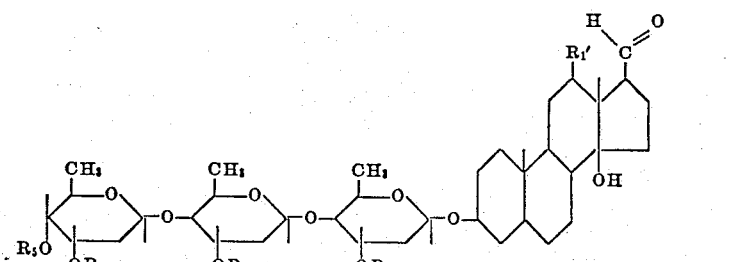

wherein R'₁ is hydrogen or hydroxyl protected by acyl or by another easily removable protective group, and R₅ is acyl or another easily removable protective group, with a phosphonoester of the formula

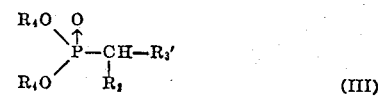

wherein
R₂ has the same meanings as in Formula I,

R′₃ has the same meanings as R₃ in Formula I except carboxyl, and

R₄ is alkyl of 1 to 4 carbon atoms, followed by removal of the protective groups by conventional methods.

Particular examples of suitable protective groups R′₁ and R₅ in Formula II are lower alkanoyl, preferably acetyl, benzyl, carbobenzoxy, trimethylsilyl, tetrahydropyranyl and phosphonoacyl.

The reaction between the 3β-tridigitoxosyl-17β-formyl-androstane (II) and the phosphonoester (III) is performed in the presence of a base, such as an alkali metal alcoholate, alkali metal hydride, alkali metal amide, alkali metal hydroxide or alkali metal carbonate, at a temperature between —40 and +50° C., preferably 0 to 20° C., and advantageously in an inert organic solvent medium, preferably an aprotic solvent, such as dimethyl glycol ether, tetrahydrofuran, dimethylsulfoxide, dimethylformamide or the like.

The subsequent removal of the protective groups may be effected by hydrolysis or hydrogenation. Thus, alkanoyl or phosphonoacyl radicals are removed by means of mild alkaline or acid hydrolysis; benzyl or carbobenzoxy radicals are split off by means of catalytic hydrogenation; and trimethsilyl or tetrahydropyranyl radicals are split off by treatment with dilute acids.

If it is desired to prepare a compound of the Formula I wherein R₃ is free carboxyl (—COOH), the initially obtained analogous carbalkoxy, carbaryloxy or carbaralkoxy compound must be hydrolized under conditions which are more severe than those required for the removal of the acyl protective groups, namely with aqueous sodium hydroxide at room temperature, or with potassium carbonate in aqueous methanol at the boiling point of the latter. Of course, if the protective substituents R₅ in Formula II are acyl or phosphonoacyl, their removal may be effected simultaneously with the hydrolysis of the esterified carboxyl group if the abovementioned severe hydrolysis conditions, that is, with aqueous sodium hydroxide at room temperature or with aqueous-methanolic potassium carbonate at reflux temperature, are applied.

Those compounds of the Formula I wherein R₃ is free carboxyl obtained in this manner may, if desired, be converted into any desired acrylic acid ester by reaction with the corresponding alcohol in the presence of dicyclohexylcarbodiimide.

The starting compounds of the Formula III are, to a major extent, described in the literature or may be prepared by various methods described in the literature.

The steroid starting compounds of the Formula II may be prepared by first protecting the free hydroxyl groups of digoxin or digitoxin with one of the protective groups above referred to, subsequently ozonolytically degrading the cardenolide radical [see, for example, K. Meyer et al., Helv. Chim. Acta 30, 1508 (1947)], converting the intermediate product obtained thereby into the corresponding vicinal 20,2-diol by mild reduction with a complex metal hydride, such as shodium borohydride, and oxidizing the vicinal diol with meta-periodic acid or sodium periodate into the corresponding 17-formyl compound of the Formula II.

The following examples further illustrate the present invention and will enable others skilled in the art to understand it more completely. It should be understood, however, that the invention is not limited solely to the particular examples given below.

EXAMPLE 1

(a) Methyl 3-(3′β-tridigitoxosyl-tetraacetate-14′β-hydroxy-5′β-androstan-17′β-yl)-acrylate 840 mgm. (7.5 millimols) of potassium tert.butylate were added in small portions to a solution of 1:58 gm. (7.5 millimols) of methyl diethylphosphono-acetate in 30 ml. of absolute dimethylglycol at 0° C. The resulting suspension was stirred for about 15 minutes, and then a solution of 3 gm. (3.42 millimols) of 3β-tridigitoxosoyl-tetraacetate-14β-hydroxy - 17β - formyl - 5β - androstane (solid, foamy substance; R_f-value: 0.48; flow agent: Ethyl acetate/benzene (2:1), silicagel plates] in 50 ml. of dimethylglycol was added dropwise thereto, and the resulting reaction mixture was stirred at room temperature for five hours more. Thereafter, the reaction solution was diluted with a saturated aqueous sodium chloride solution and then extracted several times with ethyl acetate. The combined organic extracts were washed with water, dried over sodium sulfate and evaporated in vacuo, leaving 2.5 gm. of the raw reaction product. 300 mgm. of the raw product were purified by chromatography on silicagel (ethyl acetate/benzene=4:1), yielding 200 mgm. of methyl 3-(3′β-tridigitoxosyl - tetraacetate - 14′β-hydroxy-5′β-androstan-17′β-yl)-acrylate, R_f-value: 0.55 (flow agent: Ethyl acetate; silicagel plates), melting range 180–190° C.

(b) Methyl 3-(3′β-tridigitoxosyl-14′β-hydroxy-5′β-androstan-17′β-yl)-acrylate

A solution of 2 gm. (2.14 millimols) of methyl 3-(3′β-tridigitoxosyl - tetraacetate - 14′β - hydroxy-5′β-androstan-17′β-yl)-acrylate in 200 ml. of methanol was admixed with a solution of 1.49 gm. (8.56 millimols) of potassium carbonate dihydrate in 8 ml. of water, and the mixed solution was allowed to stand overnight at room temperature. Thereafter, the reaction solution was diluted with two liters of a saturated aqueous sodium chloride solution and then extracted with ethyl acetate. The organic extract solution was washed with water, dried over sodium sulfate, evaporated in vacuo, and the residue was purified by chromatography on silicagel (benzene/ethyl acetate=1:1 to 1:3), yielding 900 mgm. (55% of theory) of a white substance which was identified to be the compound of the formula

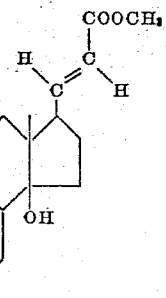

having a melting point of 242–245° C. and an R_f-value of 0.37 (silicagel plate; flow agent: Ethyl acetate/ethanol=95:5).

EXAMPLE 2

(a) 3-(3′β-tridigitoxosyl-tetraacetate-12′β-acetoxy-14′β-hydroxy-5′β-androstan-17′β-yl)-acrylonitrile 0.72 gm. (6.4 millimols) of potassium tert.butylate was added in small portions to a solution of 1.14 gm. (6.4 millimols) of diethylphosphono-acetonitrile in 10 ml. of dimethylglycol on an ice bath, the resulting mixture was stirred for about 15 minutes, and then a solution of 3 gm. (3.2 millimols) of 3β-tridigitoxosyl-tetraacetate-12β-acetoxy - 14β - hydroxy-17β-formyl-5β-androstane in 50 ml. of dimethylglycol was added dropwise thereto. The reaction mixture was now allowed to stand at room temperature for a few hours, and during that time the progress of the reaction was periodically checked by thin-layer chromatography. After the reaction had gone to completion, the reaction mixture was diluted with water and then extracted several times with ether. The combined ethereal extracts were washed with water, dried over sodium sulfate and evaporated to dryness in a rotary evaporator. 400 mgm. of the raw reaction product thus obtained were purified by chromatography on silicagel (15% deactivated) with ethyl acetate/benzene (4:1), yielding 200 mgm. of 3-(3'β-tridigitoxosyl-tetraacetate-12'β - acetoxy - 14'β - hydroxy-5'β-androstan-17'β-yl)-acrylonitrile, which sintered beginning at 85° C. and had a $R_f$-value of 0.5 (silicagel plates; flow agent: Ethyl acetate/benzene=2:1).

(b) 3-(3'β-tridigitoxosyl-12'β,14'β-dihydroxy-5'β-androstan-17'β-yl)-acrylonitrile A solution of 2.8 gm. (2.92 millimols) of 3-(3'β-tridigitoxosyl - tetraacetate - 12'β - acetoxy-14'β-hydroxy-5'β-androstan-17'β-yl)-acrylonitrile in 250 ml. of methanol was admixed with a solution of 2.55 gm. (14.6 millimols) of potassium carbonate dihydrate in 15 ml. of water, and the mixture was allowed to stand overnight at room temperature. Thereafter, the major amount of methanol was evaporated in vacuo, and the remainder was diluted with water and then extracted four to six times with chloroform. The combined organic extracts were dried over sodium sulfate and then evaporated to dryness in vacuo. The residue was purified by chromatography on silicagel (15% deactivated) with benzene/ethyl acetate=1:3, yielding 730 mgm. (33% of theory) of the compound of the formula which sintered beginning at 130° C. and had an $R_f$-value of 0.5 (silicagel plates; flow agent: ethyl acetate/ethanol=9:1).

EXAMPLE 3

(a) Using a procedure analogous to that described in Example 1(a), isopropyl 3-(3'β - tridigitoxosyl - tetraacetate-14'β - hydroxy - 5'β - androstan-17'β-yl)-acrylate, melting point range 115–130° C., $R_f$-value=0.55 (silicagel plates; flow agent: ethyl acetate/benzene=2:1), was prepared from 3 gm. (3.42 millimols) of 3β-tridigitoxosyl-tetraacetate - 14β-hydroxy-17β-formyl-5β-androstane by olefination with 1.79 gm. (7.5 millimols) of diethylphosphono-acetic acetic acid isopropyl ester in the present of 840 mgm. (7.5 millimols) of potassium tert.butylate, followed by chromatographic purification on silicagel (benzene/ethyl acetate=3:1).

(b) Using a procedure analogous to that described in Example 1(b), 730 mgm. (27.6% of theory) of the compound of the formula

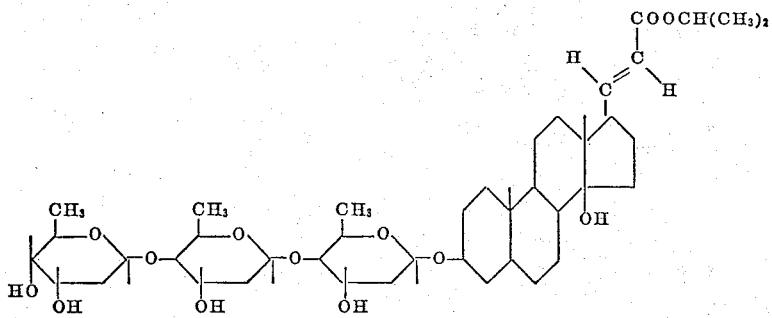

M.P. 225–228° C., $R_f$-value=0.4 (silicagel plates; flow agent: Ethyl acetate/ethanol=95:5), were obtained by hydrolysis of 3.2 gm. (3.33 millimols) of isopropyl 3-(3'β-tridigitoxosyl - tetraacetate - 14'β - hydroxy-5'β-androstan-17'β-yl)-acrylate with 2.32 gm. (13.32 millimols) of potassium carbonate dihydrate in 250 ml. of aqueous methanol, and purification by chromatography on silicagel (chloroform/acetone=4:1 to 2:1).

EXAMPLE 4

(a) Using a procedure analogous to that described in Example 1(a), methyl-3-(3'β-tridigitoxosyl-tetraacetate-14'β - hydroxy - 5'β - androstan - 17'β-yl)-2-methyl-acrylate, $R_f$-value=0.58 (silicagel plates; flow agent: Ethyl acetate), was prepared from 3 gm. (3.42 millimols) of 3β-tridigitoxosyl-tetraacetate - 14β - hydroxy - 17β - formyl-5β-androstane by olefination with 1.68 gm. (7.5 millimols) of diethylphosphono-2-methylacetic acid methyl ester in the presence of 840 mgm. (7.5 millimols) of potassium

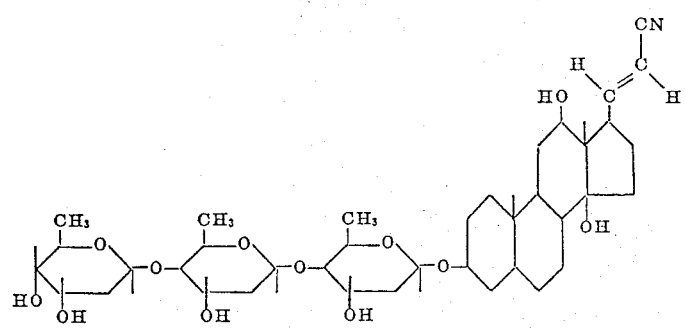

tert. butylate, followed by chromatographic purification on silicagel (benzene/ethyl acetate=3:1 to 1:1).

(b) Using a procedure analogous to that described in Example 1(b), 780 mgm. (29.6% of theory) of the compound of the formula

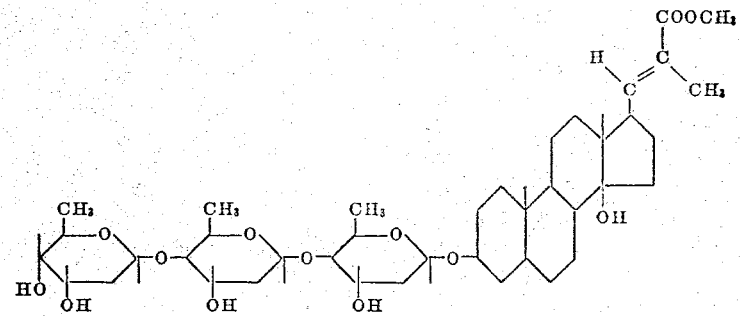

M.P. 235–237° C., $R_f$-value=0.4 (silicagel plates; flow agent: Ethyl acetate/ethanol=95:5), were obtained by hydrolysis of 3.2 gm. (3.37 millimols) of methyl 3-(3'β-tridigitoxosyl-tetraacetate-14'β - hydroxy - 5'β - androstan-17'β-yl)-2-methyl-acrylate with 2.35 gm. (13.48 millimols) of potassium carbonate in 250 ml. of aqueous methanol, and purification by chromatography on silicagel (chloroform/acetone=4:1 to 2:1).

EXAMPLE 5

(a) Using a procedure analogous to that described in Example 1(a), 1.2 gm. (45.3% of theory) of mehtyl 3 - (3'β - tridigitoxosyl - tetraacetate-14'β-hydroxy-5'β-androstan-17'β-yl)-2-fluoro-acrylate, melting point range 100–110° C., $R_f$-value=0.6 (silicagel plates; flow agent: Ethyl acetate/benzene=2:1), were obtained from 3 gm. (3.42 millimols) of 3β-tridigitoxosyl-tetraacetate-14β-hydroxy-17β-formyl-5β-androsane by olefination upon several days' standing with 1.72 gm. (7.5 millimos) of diethylphosphono-2-fluoro-acetic acid methyl ester in the presence of 840 mgm. (7.5 millimols) of potassium tert. butylate, followed by chromatographic purification on silicagel (benzene/ethyl acetate=4:1 to 3:1).

(b) Using a procedure analogous to that described in Example 1(b), 430 mgm. (43% of theory) of the compound of the formula M.P. 183–186° C., $R_f$-value=0.6 (silicagel paltes; flow agent: Ethyl acetate/ethanol=95:5), were obtained by hydrolysis of 1.0 gm. (1.29 millimols) of methyl 3-(3'β-tridigitoxosyltetraacetate - 14'β - hydroxy - 5'β - androstan - 17'β - yl)-2-fluoroacrylate with 0.9 gm. (5.16 millimols) of potassium carbonate dihydrate in a mixture of 125 ml. of methanol and 10 ml. of water.

EXAMPLE 6

(a) Using a procedure analogous to that described in Example 2(a), 3-(3'β-tridigitoxosyl-tetraacetate-14'β-hydroxy 5'β - androstan - 17'β - yl)-acrylonitrile, an amorphous substance, $R_f$-value=0.65 (silicagel plates; flow agent: Ethyl acetate/ethanol=95:5), was prepared from 3 gm. (3.42 millimols) of 3β - tridigitoxosyl-tetraacetate-14β - hydroxy - 17β-formyl-5β-androstane by olefination with 1.33 gm. (7.5 millimols) of diethylphosphono-acetonitrile in the presence of 840 mgm. (7.5 millimols) of potassium tert. butylate, followed by chromatographic purification on silicagel.

(b) Using a procedure analogous to that described in Example 2(b), 850 mgm. (33.7% of theory) of the white crystalline compound of the formula

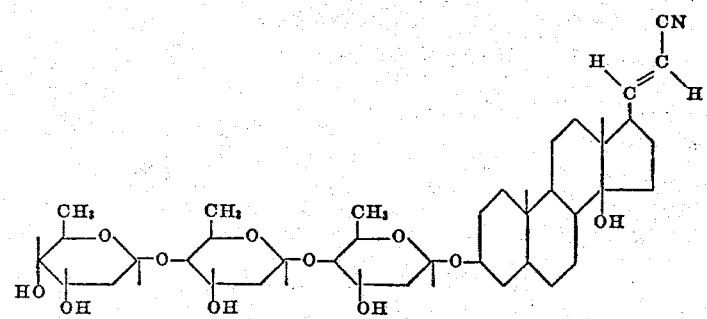

M.P. 215–217° C., $R_f$-value=0.42 (silicagel plates; flow agent: Ethyl acetate/ethanol=95:5), were obtaned by hydrolysis of 3.1 gm. (3.44 millimols) of 3-(3'β-tridigitoxosyltetraacetate - 14'β - hydroxy - 5'β - androstan-17'β-yl)-acrylonitrile with 2.39 gm. (13.76 millimols) of potassium carbonate dihydrate in a mixture of 250 ml. of methanol and 10 ml. of water.

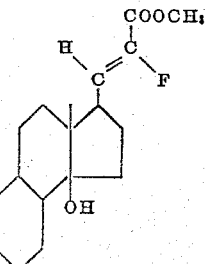

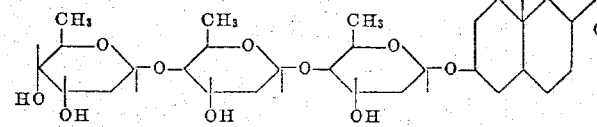

EXAMPLE 7

(a) Using a procedure analogous to that described in Example 1(a), 800 mgm. (31% of theory) of methyl 3-(3'β - tridigitoxosyl - tetraacetate - 12'β-acetoxy-14'β-hydroxy - 5'β - androstan - 17'β - yl)-2-fluoro-acrylate, an amorphous substance, $R_f$-value=0.50 (silicagel plates; flow agent: Ethyl acetate/benzene=2:1), were obtained from 2.4 gm. (2.56 millimols) of 3β-tridigitoxosyl-tetraacetate - 12β acetoxy - 14β - hydroxy - 17β-formyl-5β-androstane (white foam; $R_f$-value=0.6; flow agent: Ethyl acetate/benzene=2:1) by olefination with 1.17 gm. (5.12 millimols) of diethylphosphono-2-fluoro-acetic acid methyl ester in the presence of 575 mgm. (5.12 millimole) of potassium tert.butylate, followed by chromatographic purification on silicagel (benzene/ethyl acetate=3:1).

(b) Using a procedure analogous to that described in Example 1(b), 250 mgm. (42% of theory) of the amorphous compound of the formula

$R_f$-value=0.3 (silicagel plates; flow agent; Ethyl acetate/ethanol=9:1), were obtained by hydrolysis of 750 gm. (0.74 millimols) of methyl 3-(3'β-tridigitoxosyl-tetraacetate - 12'β,14'β - dihydroxy - 5'β-androstan-17'β-yl)-2-fluoro-acrylate with 645 mgm. (3.70 millimols) of potassium carbonate dihydrate in a mixture of 65 ml. of methanol and 1.6 ml. of water, and purification by chromatography on silicagel (chloroform/acetone=2.7:1.

EXAMPLE 8

(a) Using a procedure analogous to that described in Example 1(a), 1.0 gm. (27% of theory) of ethyl 3-(3'β-tridigitoxosyl - tetraacetate - 12'β - acetoxy-14'β-hydroxy-5'β-androstan-17'β-yl) - 2 - fluoro-acrylate, an amorphous substance, $R_f$-value=0.50 (silicagel plates; flow agent: Ethyl acetate/benzene=2:1), was obtained from 3.37 gm. (3.6 millimols) of 3β-tridigitoxosyl-tetraacetate-12β-acetoxy-14β-hydroxy-17β-formyl-5β-androstane by olefination with 1.75 gm. (7.23 millimols) of diethylphosphono-2-fluoro-acetic acid ethyl ester in the presence of 0.81 gm. (7.23 millimols) of potassium tert.butylate, followed by chromatographic purification on silicagel (benzene/ethyl acetate=3:1).

(b) Using a procedure analogous to that described in Example 1(b), 350 mgm. (49% of theory) of the amorphous compound of the formula

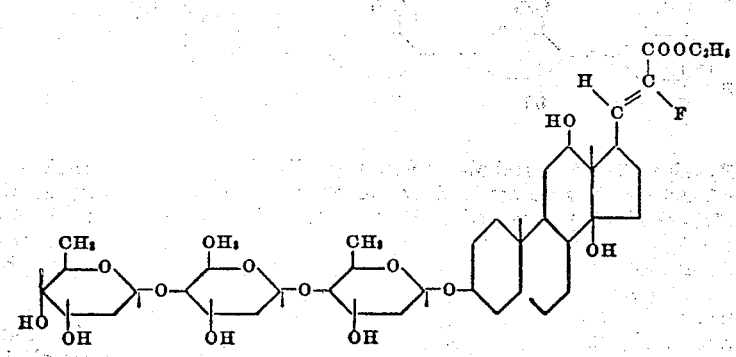

$R_f$-value=0.30 (silicagel plates; flow agent: Ethyl acetate/ethanol=9:1, were obtained by hydrolysis of 900 gm. (0.87 millimols) of ethyl 3 - (3'β-tridigitoxosyl-tetraacetate-12'β - acetoxy - 14'β - hydroxy - 5'β-androstan-17'β-yl)-2-fluoro-acrylate with 765 mgm. (4.4 millimols) of potassium carbonate dihydrate in a mixture of 75 ml. of ethanol and 5 ml. of water, and purification by chromatography on silicagel (chloroform/acetone=3:1).

EXAMPLE 9

(a) Using a procedure analogous to that described in Example 1(a), gm. (40% of theory) of methyl 3-(3'β-tridigitoxosyl-tetraacetate-12'β-acetoxy - 14'β - hydroxy-5'β-androstan-17'β-yl) - 2 - methoxy-acrylate, an amorphous substance, $R_f$-value=0.50 (silicagel plates; flow agent: Ethyl acetate/benzene=2.1), were obtained from 3 gm. (3.2 millimols) of 3β-tridigitoxosyl-tetraacetate-12β-acetoxy-14β-hydroxy - 17β - formyl-5β-androstane by olefination with 1.54 gm. (6.4 millimols) of diethylphosphone-2-methoxy-acetic acid methyl ester in the presence of 0.72 gm. (6.4 millimols) of potassium tert. butylate, followed by chromatographic purification on silica-gel (benzene/ethyl acetate=2.2:1).

(b) Using a procedure analogous to that described in Example 1(b), 550 mgm. (59% of theory) of the amorphous compound of the formula $R_f$-value=0.25 (silicagel plates; flow agent: Ethyl acetate/ethanol=9:1), were obtained by hydrolysis of 1.17 gm. (1.14 millimols) of methyl 3-(3'β-tridigitoxosyl-tetraacetate-12'β-acetoxy - 14'β - hydroxy-5'β-androstan-17'β-yl)-2-methoxy-acrylate with 0.99 gm. (5.72 millimols) of potassium carbonate dihydrate in a mixture of 100 ml. of methanol and 2.5 ml. of water, and purification by chromatography on silicagel (chloroform/acetone=1.8:1).

EXAMPLE 10

(a) Using a procedure analogous to that described in Example 1(a), 470 mgm. (44.5% of theory) of methyl 3-(3'β-tridigitoxosyl - tetraacetate-12'β-acetoxy - 14'β - hydroxy-5'β-androstan-17'β-yl)-acrylate, an amorphous substance, $R_f$-value=0.62 (silicagel plates; flow agent: Ethyl acetate), were obtained from 1 gm. (1.07 millimols) of 3β-tridigitoxosyl-tetraacetate - 12β - acetoxy-14β-hydroxy-17β-formyl-5β-androstane by olefination with 0.23 mgm. (1.12 millimols) of diethylphosphono-acetic acid methyl ester in the presence of 0.12 mgm. (1.12 millimols) of potassium tert.butylate, followed by chromatographic purification on silicagel (benzene/ethyl acetate=4:1).

(b) Using a procedure analogous to that described in Example 1(b), 210 mgm. (30% of theory) of the amorphous compound of the formula $R_f$-value=0.40 (silicagel plates; flow agent: Benzene/ethyl acetate=1:3), were obtained by hydrolysis of 900 mgm. (0.9 millimols) of methyl 3-(3'β-tridigitoxosyl-tetraacetate-12'β-acetoxy - 14'β - hydroxy-5'β-androstan-17'β-yl)-acrylate with 750 mgm. (4.5 millimols) of potassium carbonate dihydrate in a mixture of 75 ml. of methanol and 2.5 ml. of water, and purification by chromatography on silicagel (benzene/ethyl acetate=1:3).

EXAMPLE 11

(a) Using a procedure analogous to that described in Example 1(a), 1.85 gm. (55% of theory) of n-butyl 3-(3'β-tridigitoxosyl - tetraacetate - 14'β - hydroxy-5'β-androstan-17'β-yl)-acrylate, M.P. 173–175° C., $R_f$-value=0.56 (silicagel plates; flow agent: Benzene/ethyl acetate=1:2), were obtained from 3 gm. (3.42 millimols) of 3β-tridigitoxosyl-tetraacetate - 14β - hydroxy-17β-formyl-5β-androstane by olefination with 1.89 gm. (7.5 millimols) of diethylphosphono-acetic acid n-butyl ester in the presence of 0.84 gm. (7.5 millimols) of potassium tert.butylate, followed by chromatographic purification on silicagel (benzene/ethyl acetate=3:1).

(b) Using a procedure analogous to that described in Example 1(b), 0.5 gm. (23% of theory) of the compound of the formula

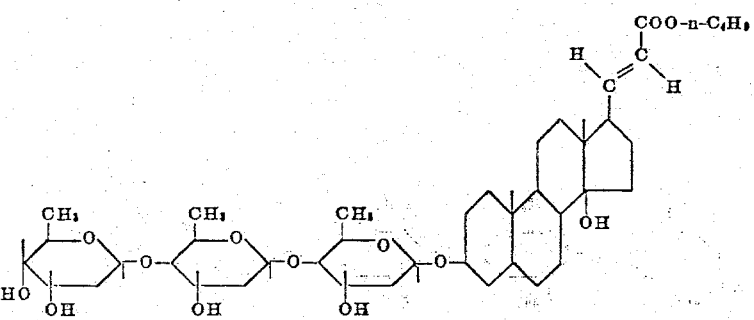

melting range 190–203° C., $R_f$-value=0.45 (silicagel plates; flow agent: Ethyl acetate/ethanol=95:5), were obtained by hydrolysis of 2.6 gm. (2.66 millimols) of n-

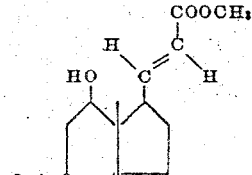

butyl 3-(3′β-tridigitoxosyl - tetraacetate-14′β-hydroxy-5′β-androstan-17′β-yl)-acrylate with 1.85 gm. (10.64 millimols) of potassium carbonate dihydrate in a mixture of 250 ml. of methanol and 10 ml. of water, and purification by chromatography on silicagel (chloroform/acetone= 3.5:1 to 2:1).

EXAMPLE 12

(a) Using a procedure analogous to that described in Example 1(a), 1.0 gm. (27% of theory) of ethyl 3-(3′β-tridigitoxosyl-tetraacetate-12′β - acetoxy-14′β-hydroxy-5′β-androstan-17′β-yl)-2-chloro-acrylate, an amorphous substance, $R_f$-value=0.50 (silicagel plates; flow agent: Ethyl acetate/benzene=2:1), was obtained from 3.3 gm. (3.52 millimols) of 3β-tridigitoxosyl-tetraacetate - 12β - acetoxy-14β-hydroxy-17β-formyl-5β-androstane by olefination with 3.11 gm. (12 millimols) of diethylphosphono-2-chloro-acetic acid ethyl ester in the presence of 1.35 gm. (12 millimols) of potassium tert.butylate, followed by chromatographic purification on silicagel (benzene/ethyl acetate= 3:1).

(b) Using a procedure analogous to that described in Example 1(b), 350 mgm. (49% of theory) of the amorphous compound of the formula

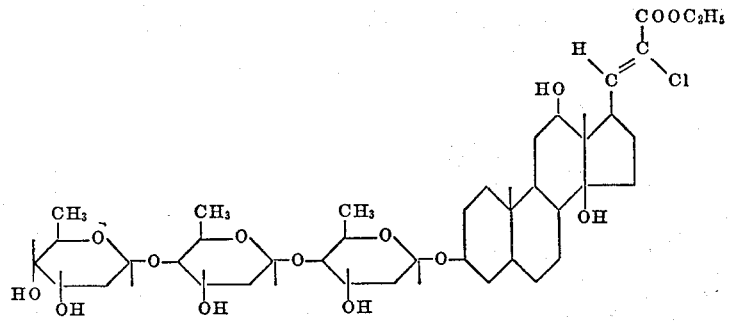

$R_f$-value=0.30 (silicagel plates; flow agent: Ethyl acetate/ethanol=9:1), were obtained by hydrolysis of 900 mgm. (0.86 millimols) of ethyl 3-(3′β-tridigitoxosyl-tetraacetate-12′β-acetoxy-14′β-hydroxy-5′β-androstan - 17′β - yl)-2-chloro-acrylate with 0.72 gm. (4.32 millimols) of potassium carbonate dihydrate in a mixture of 70 ml. of ethanol and 5 ml. of water, and purification by chromatography on silicagel (chloroform/acetone=3:1).

The compounds according to the present invention, that is, those embraced by Formula I above, have useful pharmacodynamic properties. More particularly, the compounds of the instant invention exhibit effective cardiotonic activities, as manifested by a positive inotropic action upon the isolated auricle of the guinea pig heart.

Especially effective cardiotonics are the following compounds:

3-(3′β-tridigitoxosyl-12′β,14′β-dihydroxy-5′β-androstan-17′β-yl)-acrylonitrile;

Methyl 3-(3′β-tridigitoxosyl-12′β,14′β-dihydroxy-5′β-androstan-17′β-yl)-2-fluoro-acrylate;

Methyl 3-(3′β-tridigitoxosyl-14′β-hydroxy-5′β-androstan-17′β-yl)-2-fluoro-acrylate; and Methyl 3-(3′β-tridigitoxosyl-14′β-hydroxy-5′β-androstan-17′β-yl)-2-methyl-acrylate.

However, the compounds of the Formula I are also useful as intermediates in the preparation of the cardiotonic steroid glycosides, such as 3-{3β-[(3,4-O-isopropylidene-β-D-digitoxosyl)-(1→4) - O - (β-D-digitoxosyl)-(1→4)-O-(β-D-digitoxosyl)] - 12β,14β - dihydroxy-5β-androstan-17β-yl}-acrylonitrile or 3-{3β-[(3-acetyl-β-D-digitoxosyl)-(1→4) - O - (β - D - digitoxosyl) - (1→4)-O-(β-D-digitoxosyl)]-12β,14β - dihydroxy - 5β - androstan-17β-yl}-acrylonitrile.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.002 to 0.034 mgm./kg. body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 13

Tablets

The tablet composition is compounded from the following ingredients:

| | Parts |
|---|---|
| 3-(3′β-tridigitoxosyl - 12′β,14′β - dihydroxy-5′β-androstan-17′β-yl)-acrylonitrile | 0.25 |
| Lactose | 80.75 |
| Potato starch | 30.00 |
| Gelatin | 3.00 |
| Magnesium stearate | 1.00 |
| Total | 120.00 |

Preparation.—The acrylonitrile compound is intimately admixed with 2.5 parts of lactose, the mixture is admixed with the remainder of the lactose and the potato starch, the resulting mixture is moistened with an aqueous 10% solution of the gelatin, the moist mass is forced through a 1.5 mm.-mesh screen, the resulting granulate is dried at 40° C. and again passed through a 1 mm.-mesh screen, the dry granulate is admixed with the magnesium stearate, and the composition is compressed into 120 mgm.-tablets in a conventional tablet making machine. Each tablet contains 0.25 mgm. of the acrylonitrile compound and is an oral dosage unit composition with effective positive inotropic cardiotonic action.

EXAMPLE 14
Coated pills

The pill core composition is compounded from the following ingredients:

| | Parts |
|---|---|
| Methyl 3-(3'β-tridigitoxosyl - 12'β,14'β - dihydroxy-5'β-androstan-17'β-yl)-2-fluoro-acrylate | 0.25 |
| Lactose | 32.25 |
| Corn starch | 15.00 |
| Polyvinylpyrrolidone | 2.00 |
| Magnesium stearate | 0.50 |
| Total | 50.00 |

Preparation.—The acrylate is intimately admixed with 2.5 parts of lactose, the mixture is admixed with the remainder of the lactose and the corn starch, the resulting mixture is moistened with an aqueous 15% solution of the polyvinylpyrrolidone, the moist mass is forced through a 1 mm.-mesh screen, the resulting granulate is dried at 40° C. and again passed through the screen, the dry granulate is admixed with the magnesium stearate, and the composition is compressed into 50 mgm.-pill cores which are subsequently coated with a thin shell consisting essentially of a mixture of sugar and talcum and polished with beeswax. Each coated pill contains 0.25 mgm. of the acrylate and is an oral dosage unit composition with effective positive inotropic cardiotonic action.

EXAMPLE 15
Drop solution

The solution is compounded from the following ingredients:

| | Parts |
|---|---|
| Methyl 3-(3'β-tridigitoxosyl - 14'β - hydroxy-5'β-androstan-17'β-yl)-2-methyl-acrylate | 0.0125 |
| Saccharin sodium | 0.3 |
| Sorbic acid | 0.1 |
| Ethanol | 30.0 |
| Flavoring | 1.0 |
| Distilled water, q.s. ad | 100.0 |

Preparation.—The acrylate and the flavoring are dissolved in the ethanol, the resulting solution is admixed with a solution of the sorbic acid and the saccharin sodium in the distilled water, and the mixed solution is filtered until free from suspended matter. 1 ml. (about 20 drops) of the filtrate contains 0.125 mgm. of the acrylate and is an oral dosage unit composition with effective positive inotropic cardiotonic action.

EXAMPLE 16
Hypodermic solution

The solution is compounded from the following ingredients:

| | Parts |
|---|---|
| 3-(3'β-tridigitoxosyl - 12'β,14'β - dihydroxy-5'β-androstan-17'β-yl)-acrylonitrile | 0.25 |
| Polyethyleneglycol 600 | 150.00 |
| Tartaric acid | 5.00 |
| Distilled water, q.s. ad (by vol.) | 1000.00 |

Preparation.—The tartaric acid, the polyethyleneglycol and the acrylonitrile compound are successively dissolved in a sufficient amount of distilled water, and the resulting solution is diluted to the indicated volume with distilled water and then filtered until free from suspended water. The filtrate is filled into 3 ml.-ampules in an atmosphere of nitrogen, and the filled ampules are sterilized for 20 minutes at 120° C. and then sealed. Each ampule contains 0.25 mgm. of the acrylonitrile compound, and the contents thereof are an injectable dosage unit composition with effective positive inotropic cardiotonic action.

EXAMPLE 17
Suppositories

The suppository composition is compounded from the folowing ingredients:

| | Parts |
|---|---|
| Methyl 3-(3'β-tridigitoxosyl-12'β,14'β-dihydroxy-5'β - androstan - 17'β-yl)-2-fluoro-acrylate | 0.25 |
| Lactose | 4.75 |
| Suppository base (e.g. cocoa butter) | 1695.00 |
| Total | 1700.00 |

Preparation.—The acrylate and the lactose are admixed with each other, the mixture is milled and then blended with the aid of an immersion homogenizer in the suppository base which had previously been melted and cooled to 40° C., and 1700 mgm.-portions of the resulting composition are poured at 37° C. into cooled suppository molds and allowed to harden. Each suppository contains 0.25 mgm. of the acrylate and is a rectal dosage unit composition with effective positive inotropic cardiotonic action.

Analogous results are obtained when any one of the other compounds embraced by Formula I is substituted for the particular acrylic acid compound in Examples 13 through 17. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

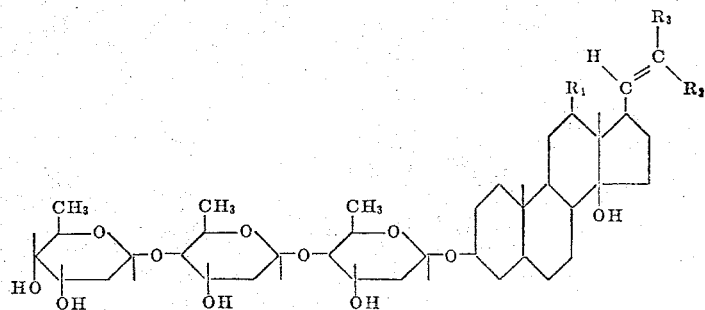

wherein
$R_1$ is hydrogen or hydroxyl,
$R_2$ is hydrogen, chlorine, fluorine, alkyl of 1 to 4 carbon atoms, alkoxy of 1 to 4 carbon atoms or cyano, and
$R_3$ is cyano, carboxyl or lower carbalkoxy.

2. A compound according to claim 1, wherein
$R_1$ is hydrogen or hydroxyl,
$R_2$ is hydrogen, chlorine, fluorine, methyl or methoxy, and
$R_3$ is cyano, carboxyl or (alkoxy of 1 to 4 carbon atoms)-carbonyl.

3. A compound according to claim 2, which is 3-(3'β- tridigitoxosyl - 12′β,14′β - dihydroxy-5′β-androstan-17′β-yl)-acrylonitrile.

4. A compound according to claim 2, which is methyl 3-(3′β - tridigitoxosyl - 12′β,14′β - dihydroxy-5′β-androstan-17′β-yl)-2-fluoro-acrylate.

5. A compound according to claim 2, which is methyl 3-(3′β - tridigitoxosyl - 14′β - hydroxy - 5′β - androstan-17′β-yl)-2-fluoro-acrylate.

6. A compound according to claim 2, which is methyl 3-(3′β - tridigitoxosyl - 14′β - hydroxy - 5′β - androstan-17′β-yl)-2-methylacrylate.

References Cited
UNITED STATES PATENTS

| | | | |
|---|---|---|---|
| 3,538,078 | 11/1970 | Kaiser et al. | 260—210.5 |
| 3,579,499 | 5/1971 | Clarkson | 260—211.5 |

LEWIS GOTTS, Primary Examiner

J. R. BROWN, Assistant Examiner

U.S. Cl. X.R.

424—182

UNITED STATES PATENT OFFICE
CERTIFICATE OF CORRECTION

Patent No. 3,752,803                     Dated   Aug. 14, 1973

Inventor(s) WOLFGANG EBERLEIN, JOACHIM HEIDER, WALTER KOBINGER and WILLI DIEDEREN It is certified that error appears in the above-identified patent and that said Letters Patent are hereby corrected as shown below:

Col. 3, line 71 - correct "20,2-diol" to read --20,21-diol--.

Col. 4, line 16 - correct "tridigitoxosoyl" to read --tridigitoxosyl--.

Col. 7, line 32 - correct the spelling of "methyl";

"     "    "  38 - correct "androsane" to read --androstane--.

Col. 10, line 64 - insert -- 1.3 -- before "gm.";

"     "    "  72 - correct "phone" to read --phono--.

Signed and sealed this 14th day of May 1974.

(SEAL)
Attest:

EDWARD M.FLETCHER,JR.                    C. MARSHALL DANN
Attesting Officer                        Commissioner of Patents